US010956565B2

(12) United States Patent
Sander et al.

(10) Patent No.: US 10,956,565 B2
(45) Date of Patent: Mar. 23, 2021

(54) VISUALIZATION OF ASSOCIATIONS AMONG DATA RECORDS IN A SECURITY INFORMATION SHARING PLATFORM

(71) Applicant: ENTIT SOFTWARE LLC, Sanford, NC (US)

(72) Inventors: Tomas Sander, Princeton, NJ (US); Brian Frederik Hosea Che Hein, Aliso Viejo, CA (US); Nadav Cohen, Sunnyvale, CA (US); Ted Ross, Austin, TX (US)

(73) Assignee: MICRO FOCUS LLC, Santa Clara, CA (US)

( * ) Notice: Subject to any disclaimer, the term of this patent is extended or adjusted under 35 U.S.C. 154(b) by 215 days.

(21) Appl. No.: 16/076,948

(22) PCT Filed: Feb. 12, 2016

(86) PCT No.: PCT/US2016/017803
§ 371 (c)(1),
(2) Date: Aug. 9, 2018

(87) PCT Pub. No.: WO2017/138957
PCT Pub. Date: Aug. 17, 2017

(65) Prior Publication Data
US 2019/0050563 A1 Feb. 14, 2019

(51) Int. Cl.
G06F 21/00 (2013.01)
G06F 21/55 (2013.01)
(Continued)

(52) U.S. Cl.
CPC .......... G06F 21/552 (2013.01); G06F 16/287 (2019.01); G06Q 10/00 (2013.01); G06Q 10/0635 (2013.01)

(58) Field of Classification Search
CPC ............... G06Q 10/00; G06Q 10/0635; G06Q 10/0637; G06Q 10/06; G06Q 10/103;
(Continued)

(56) References Cited

U.S. PATENT DOCUMENTS 8,185,558 B1 * 5/2012 Narayanan ............... G06F 16/24
707/798
8,307,427 B1 * 11/2012 Wisilosky ............... G06F 21/16
707/781
(Continued)

FOREIGN PATENT DOCUMENTS

EP 2911078 A2 8/2015
WO WO-2014138115 A1 9/2014

OTHER PUBLICATIONS

Haystax Technology, Inc., Enterprise Threat Intelligence, Jul. 23, 2015, Retrieved from the Internet: <http://www.haystax.com/solutions/enterprise-threat-management/> [retrieved on Jul. 23, 2015], 6 pages.
(Continued)

Primary Examiner — Don G Zhao

(57) ABSTRACT

Examples disclosed herein relate to visualization of associations among data records in a security information sharing platform. Some examples may enable creating, in the security information sharing platform, an association between a first data record comprising a security indicator, and a second data record. Some examples may further enable providing a visual representation of the first data record, the second data record, and the association, wherein the first data record represents a first node in the visual representation, the second data record represents a second node in the visual representation, and the association represents an edge that connects the first node and the second node.

20 Claims, 5 Drawing Sheets

(51) Int. Cl.
*G06Q 10/06* (2012.01)
*G06F 16/28* (2019.01)
*G06Q 10/00* (2012.01)

(58) Field of Classification Search
CPC . G06Q 10/0631; G06F 16/287; G06F 21/552; G06F 3/04847; G06F 3/0486; G06F 3/0482; G06F 8/433; G06F 8/10; G06F 8/71; G06F 8/34; G06F 3/04817; G06F 8/77
See application file for complete search history.

(56) References Cited

U.S. PATENT DOCUMENTS

| | | | | |
|---|---|---|---|---|
| 8,682,764 | B2* | 3/2014 | Love | G06Q 10/10 705/35 |
| 8,874,550 | B1* | 10/2014 | Soubramanien | G06F 21/00 707/722 |
| 9,027,125 | B2* | 5/2015 | Kumar | G06F 21/52 726/22 |
| 9,210,185 | B1* | 12/2015 | Pinney Wood | G06F 21/552 |
| 9,516,053 | B1* | 12/2016 | Muddu | G06N 5/022 |
| 9,596,254 | B1* | 3/2017 | Muddu | G06F 16/24578 |
| 9,838,410 | B2* | 12/2017 | Muddu | G06F 16/24578 |
| 10,003,605 | B2* | 6/2018 | Muddu | G06F 3/0482 |
| 10,015,177 | B2* | 7/2018 | Muddu | G06F 3/0482 |
| 10,389,738 | B2* | 8/2019 | Muddu | G06F 16/285 |
| 10,423,996 | B2* | 9/2019 | Barday | G06Q 50/265 |
| 2012/0005631 | A1* | 1/2012 | B'Far | G06F 16/288 715/854 |
| 2012/0110633 | A1* | 5/2012 | An | H04L 63/1408 726/1 |
| 2013/0097180 | A1* | 4/2013 | Tseng | G06F 16/955 707/748 |
| 2013/0191416 | A1* | 7/2013 | Lee | G06F 16/2457 707/771 |
| 2014/0007190 | A1* | 1/2014 | Alperovitch | H04L 63/1441 726/3 |
| 2014/0007238 | A1* | 1/2014 | Magee | H04L 63/1408 726/24 |
| 2014/0090056 | A1* | 3/2014 | Manadhata | H04L 63/14 726/23 |
| 2014/0279641 | A1* | 9/2014 | Singh | G06Q 50/265 705/325 |
| 2015/0261951 | A1* | 9/2015 | Abuelsaad | G06F 21/554 726/22 |
| 2016/0099963 | A1* | 4/2016 | Mahaffey | H04W 12/02 726/25 |
| 2016/0164905 | A1* | 6/2016 | Pinney Wood | G06F 21/577 726/25 |
| 2016/0164906 | A1* | 6/2016 | Pinney Wood | G06F 21/577 726/25 |
| 2017/0063888 | A1* | 3/2017 | Muddu | H04L 41/22 |
| 2017/0063904 | A1* | 3/2017 | Muddu | G06F 16/254 |
| 2017/0063905 | A1* | 3/2017 | Muddu | G06F 16/24578 |
| 2017/0063909 | A1* | 3/2017 | Muddu | H04L 41/0893 |
| 2017/0063910 | A1* | 3/2017 | Muddu | H04L 43/062 |
| 2017/0063911 | A1* | 3/2017 | Muddu | H04L 63/06 |
| 2017/0063912 | A1* | 3/2017 | Muddu | H04L 41/0893 |
| 2019/0132344 | A1* | 5/2019 | Lem | G06N 5/003 |

OTHER PUBLICATIONS

International Searching Authority, International Search Report & Written Opinion dated Nov. 8, 2016 for Application No. PCT/US2016/017803 filed Feb. 12, 2016, 12 pages.

Netcitadel ADDS Palo Alto Networks, Data Visualization, and Threat Scoring Support to Threatoptics, Feb. 25, 2014, Press Release, NetCitadel, Inc., 2 pages.

Yu, S., et al., Attributed-Based on-Demand Multicase Group Setup with Membership Anonymity, SecureComm 2008, Sep. 22-25, 2008, 6 pages.

* cited by examiner

VISUALIZATION OF ASSOCIATIONS AMONG DATA RECORDS IN A SECURITY INFORMATION SHARING PLATFORM

BACKGROUND

Users of a security information sharing platform share security information (e.g., security indicators, observables, threat actors, malware samples, chains of attack, attack campaigns, etc.) with other users in an effort to advise the other users of any security threats, or to gain information related to security threats from other users.

BRIEF DESCRIPTION OF THE DRAWINGS

The following detailed description references the drawings, wherein.

DETAILED DESCRIPTION

Figure 1:
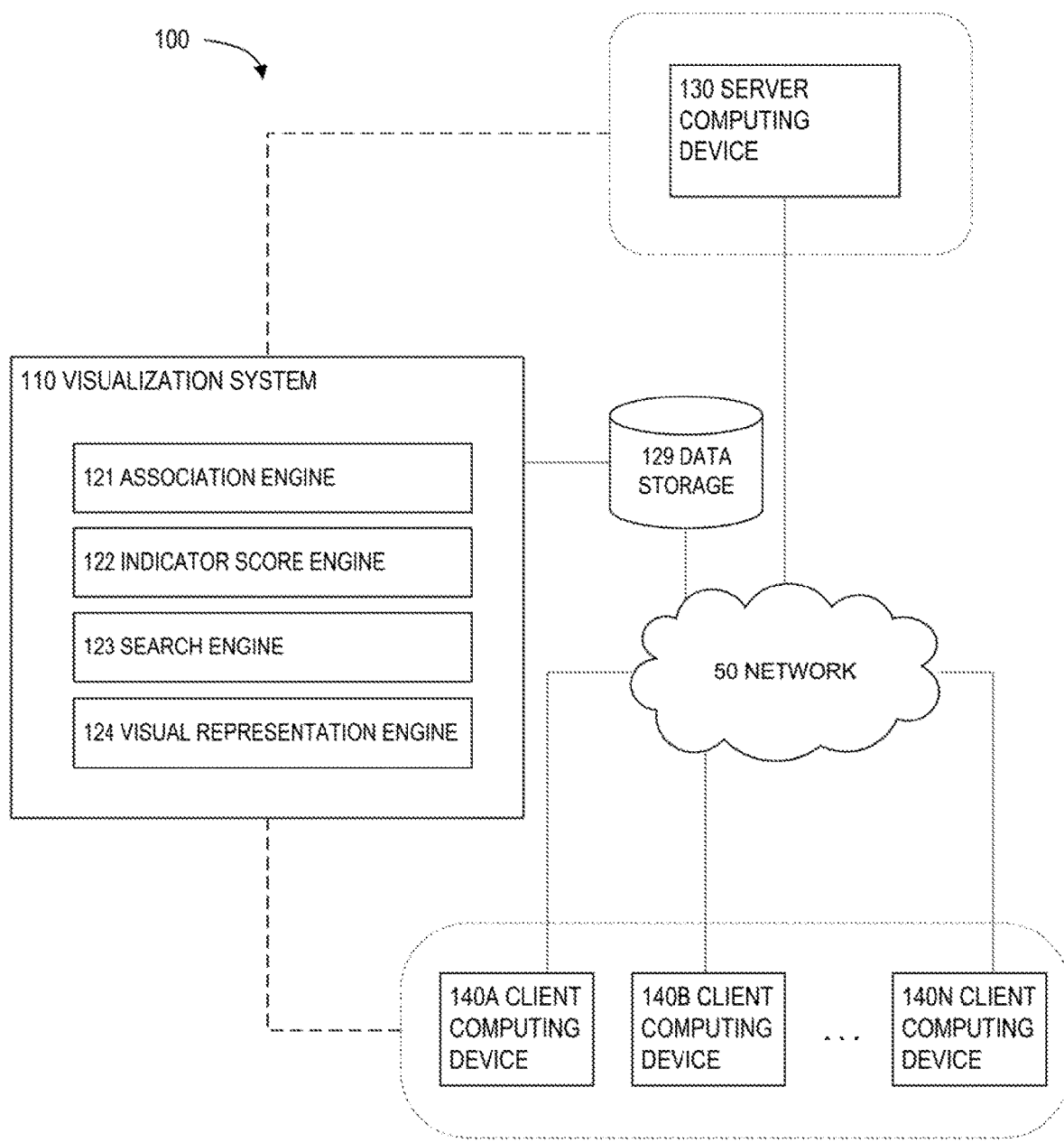
FIG. 1 is a block diagram depicting an example environment in which various examples may be implemented as a visualization system.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Users of a security information sharing platform share security information (e.g., security indicators, observables, threat actors, malware samples, chains of attack, attack campaigns, etc.) with other users in an effort to advise the other users of any security threats, or to gain information related to security threats from other users. The other users with whom the security information is shared typically belong to a community that is selected by the user for sharing, or to the same community as the user. The other users of such communities may further share the security information with further users and/or communities. A "user," as used herein, may include an individual, organization, or any entity that may send, receive, and/or share the security information. A community may include a plurality of users. For example, a community may include a plurality of individuals in a particular area of interest. A community may include a global community where any user may join, for example, via subscription. A community may also be a vertical-based community. For example, a vertical-based community may be a healthcare or a financial community. A community may also be a private community with a limited number of selected users.

A "security indicator," as used herein, may refer to a detection guidance for a security threat and/or vulnerability. In other words, the security indicator may specify what to detect or look for (e.g., an observable) and/or what it means if detected. For example, the security indicator may specify a certain Internet Protocol (IP) address to look for in the network traffic. The security indicator may include the information that the detection of that IP address in the network traffic can indicate a certain malicious security threat such as a Trojan virus. An "observable," as used herein, may refer to an event pertinent to the operation of computers and networks (e.g., an event occurring in network, servers, applications, databases, and/or various components of any computer system). Examples of an observable may include but not be limited to: an IP address, a domain name, an e-mail address, Uniform Resource Locator (URL), and a software file hash. A security indicator may comprise a single observable (e.g., "a new file is created by an executable") or a plurality of observables (e.g., "a new file is created by an executable and "the executable connects to domain X").

A security indicator may be created by and/or originated from at least one of a plurality of source entities. For example, the plurality of source entities may include a user (e.g., analysts and/or community members of the security information sharing platform). A security indicator may be manually created and/or added to the security information sharing platform by the user. In another example, the plurality of source entities may include a threat intelligence provider that provides threat intelligence feeds and/or any other participating organizations. A security indicator that is found in the intelligence feeds and/or information from other participating organizations, for example, may be automatically created and/or added to the security information sharing platform. There exist a number of providers of threat intelligence feeds. The threat intelligence feeds may be provided by independent third parties such as security service providers. These providers and/or sources may supply the threat intelligence feeds that provide information about threats the providers have identified. Most threat intelligence feeds, for example, include lists of domain names, IP addresses, and URLs that various providers have classified as malicious or at least suspicious according to different methods and criteria. Other examples of source entities may include but not be limited to government sources and open source feeds.

As more security indicators are gathered from various source entities and added to the security information sharing platform, the security information sharing platform would become a rich source of threat intelligence information itself. To maximize the richness of threat intelligence information gathered by the platform, it may be important to define appropriate associations and/or relationships among various data records resided in the security information sharing platform, which can be a time-consuming and technically challenging task. In addition, the strength of associations may vary, and determining appropriate strength for individual associations may add another layer of complexity.

In some instances, data records, their associations, and/or strengths of such associations may contribute scores (e.g., indicator score, threat actor score, etc.) for each of the data records. Because a score for a particular data record can be influenced by many factors associated with the data records associated with the particular data record, and/or strengths of those associations, it may be difficult for users (e.g., analysts) to decipher and understand how the score was determined.

Examples disclosed herein provide solutions to these challenges by providing a technique to enable visualization of data records, their associations, and/or strengths of such associations. This would allow, for example, an analyst to mine and interactively traverse the intelligence data of the platform, leveraging the associations and/or relationships (and/or strengths thereof) defined among the data records. As a result, the security information sharing platform may provide important tactical and strategic information to the analyst (e.g., about which threat actors may be attacking his/her organizations and which security indicators the analyst should look for in his/her infrastructure).

In addition, the visualization may help users understand how a score was determined so that they can determine themselves the credibility of the score. The visualization may be interactive, enabling a user to drill down items that are of interest to the user, and to manually update the score determination as the user interacts with the visualization. This would allow the user to correct certain data records, associations, and/or strengths thereof and would help improve the overall accuracy of scores and intelligence data in the security information sharing platform.

Some examples may enable creating, in the security information sharing platform, an association between a first data record comprising a security indicator, and a second data record. Some examples may further enable providing a visual representation of the first data record, the second data record, and the association, wherein the first data record represents a first node in the visual representation, the second data record represents a second node in the visual representation, and the association represents an edge that connects the first node and the second node.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

FIG. 1 is an example environment 100 in which various examples may be implemented as a visualization system 110. Visualization system 110 may include a server computing device in communication with client computing devices via a network 50. The client computing devices may communicate requests to and/or receive responses from the server computing device. The server computing device may receive and/or respond to requests from the client computing devices. The client computing devices may be any type of computing device providing a user interface through which a user can interact with a software application. For example, the client computing devices may include a laptop computing device, a desktop computing device, an all-in-one computing device, a thin client, a workstation, a tablet computing device, a mobile phone, an electronic book reader, a network-enabled appliance such as a "Smart" television, and/or other electronic device suitable for displaying a user interface and processing user interactions with the displayed interface. While the server computing device can be a single computing device, the server computing device may include any number of integrated or distributed computing devices.

The various components (e.g., components 129, 130, and/or 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, visualization system 110 and the various components described herein may be implemented in hardware and/or a combination of hardware and programming that configures hardware. Furthermore, in FIG. 1 and other Figures described herein, different numbers of components or entities than depicted may be used.

Visualization system 110 may comprise an association engine 121, an indicator score engine 122, a search engine 123, a visual representation engine 124, and/or other engines. The term "engine", as used herein, refers to a combination of hardware and programming that performs a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Association engine 121 may create, in a security information sharing platform, associations and/or relationships among various data records in a security information sharing platform. As discussed above, the security information sharing platform may enable sharing of security information (e.g., security indicators, observables, threat actors, malware samples, chains of attack, attack campaigns, etc.) among a plurality of users and/or a plurality of communities. For example, a particular security indicator may be associated another data record such as an observable, another security indicator, a threat actor, a malware (e.g., or sample thereof), a chain of attack, an organization, an industry sector, a community, a domain name, an indicator score for the particular security indicator, a source entity, a level of confidence (e.g., the level of confidence that the indicator is actually malicious and/or accurate), a level of severity (e.g., the level of severity that the indicator may pose), and/or a sighting of an observable of the particular security indicator. Note that any associations created by association engine 121 may be modified and/or removed at any given time.

Such associations among different data records resided in the security information sharing platform may be created in various ways:

In some implementations, association engine 121 may create an association between the particular security indicator (and/or an observable therein) and a data record based on user input. For example, as a user submits the particular security indicator to the platform, the user (or another user) may choose to share other information that the user has regarding the indicator. The user who has the knowledge about a threat actor behind the security threat posed by the particular security indicator may create the association between the particular security indicator and the data record that corresponds to that threat actor using the platform.

In some implementations, association engine 121 may create an association between the particular security indicator (and/or an observable therein) and a data record based on whether the data record is created in the same case as the particular security indicator (and/or an observable therein). For example, a user may open a new case in the security information sharing platform and submit 3 security indicators that are related to this new case. This may cause association engine 121 to create the associations between these 3 indicators and/or observables therein.

In some implementations, association engine 121 may create an association between the particular security indicator (and/or an observable therein) and a data record based on external data (e.g., data external to the security information sharing platform). In one example, domain name service (DNS) data (e.g., passive DNS data) may include an IP address (e.g., an observable) associated with a particular domain name (e.g., internic.net), a particular registrar (e.g., ABC Registrar, Inc.), a particular nameserver (e.g., NS.EXAMPLE.COM), etc. Association engine 121 may identify a data record corresponding to the particular domain name in the security information sharing platform and may create an association between the particular security indicator having that IP address and the data record corresponding to the particular domain name. In another example, threat intelligence feeds may be used to identify data records that may be associated with the particular security indicator. In many cases, the threat intelligence feeds may include the information related to a threat actor, a severity, an organization, an industry sector, etc. with respect to individual security indicators in the feeds. Association engine 121 may refer to the threat intelligence feeds to create appropriate associations between the particular security indicator and a data record corresponding to the threat actor, severity, organization, industry sector, etc. as identified in the threat intelligence feeds.

In some implementations, association engine 121 may create an association between the particular security indicator (and/or an observable therein) and a data record (e.g., malware sample) based on an automated malware analysis. The automated malware analysis may, for example, build a mapping of IP address, domains, registry changes, and/or other security indicators to a specific malware sample (e.g., each sample may be identified a corresponding malware identifier). Based on this analysis, association engine 121 may create appropriate associations between indicators (and/or the observables therein) and the malware samples. In some situations, different malware samples may be clustered (e.g., associated by association engine 121) to create a malware cluster if the analysis determines that those malware samples are sufficiently similar (e.g., a common author, similar codes, similar observables, etc.).

In some implementations, association engine 121 may create an association between the particular security indicator (and/or an observable therein) and a data record based on information related to a chain of an attack (or also known as a cyber kill chain). A chain of an attack describes multiple stages of a security attack. For example, an attacker (or threat actor) may send a malware to a victim by email or other means in a first stage. The malware may be installed on a computer by the victim in a second stage. In a third stage, the attacker may perform the steps to achieve his goals inside the victim's network. Using this example, if the particular security indicator is associated with a particular threat actor, the above described kill chain involving the same threat actor may be also associated with the particular security indicator. For example, a data record corresponding to the malware sample identified in the kill chain may be associated with the particular security indicator by association engine 121.

In some implementations, association engine 121 may create an association between the particular security indicator (that comprises an observable) and a data record based on sightings of that observable. For example, the sightings may represent a number (e.g., count) of sightings of the observable by at least one source entity associated with the data record. In other words, it may indicate the number of times that the observable has been observed by at least one source entity. The security information sharing platform may keep track of information related to sightings of an observable. The platform may obtain from a source entity, a sighting of an observable. The sighting of the observable may indicate that the observable has been observed by the source entity. For example, the source entity may detect a certain IP address (e.g., the observable) in its network traffic, and add the observable to the security information sharing platform. This addition of the observable may be considered as a single sighting of the observable. In some instances, when two individuals working for the same organization add the same observable to the platform, the platform may treat these additions as a single sighting of the observable or as two separate sightings of the observable. In another example, when the IP address (e.g., the observable) is found in the threat intelligence feeds provided by a particular threat intelligence provider, this observable may be added to the security information sharing platform as a single sighting of this observable. When two different sets of threat intelligence feeds provided by two different providers include the same observable, the observable may be added as two sightings of the observable.

For example, the data record may represent a group that a source entity belongs to such as an organization (e.g., a bank), an industry sector (e.g., financial services), a geography, and/or a community (e.g., of the security information sharing platform). Consider the following scenario: the particular security indicator having the observable was initially submitted by a user of a first group (e.g., a first community). The security information sharing platform learns that that same observable has been sighted (e.g., observed) by at least one user of a second group (e.g., a second community) for a number of times. Association engine 121 may create an association between the particular security indicator and the second group if the number of sightings (e.g., the number of all of sightings that have been reported so far, the number of sightings over a particular time period, a frequency of sightings, etc.) by users of the second group exceeds a predetermined threshold value. For example, if a total number of sightings by users of the second group equals 8 where the predetermined threshold value has been set to be 7, the association between the particular security indicator and the second group may be created.

Association engine 121 may determine strength of an association (e.g., that has been created as discussed above) based on various parameters. In other words, the strength of each association may vary based on the parameters including, but are not limited to: (1) a likelihood of change in the association, (2) a creator and/or verifier of the association, (3) an aging rate of the association, and (4) a quality of evidence that supports the association. Each of the above example parameters is further discussed below.

(1) A likelihood of change in the association: A likelihood of change in the association may depend on the volatility and/or expected life of the data record(s) that are connected by the association. For example, the strength of some associations tend to decrease quicker (e.g., the associations between IP addresses and domain names). The association between an IP address and a domain name may remain unchanged for a short period of time because an IP address tends to change quickly over time. On the other hand, associations, such as an association between a threat actor and the threat actor's preferred tactics, techniques, and procedures (TTPs) is less likely to change over time. Thus, a first association (e.g., the association between a threat actor and its TTPs) having a lower likelihood of change may be increased in its strength by a higher percentage than a second association (e.g., the association between an IP address and a domain name) having a higher likelihood of change.

(2) A creator and/or verifier of the association: Association engine 121 may determine whether the association was created (and/or verified) by a user of the platform, a trusted third-party entity, and/or automatically created by the platform itself. For example, the association created and/or verified by a user of the platform or a trusted third-party entity may be given a higher strength than the association that was automatically computed or otherwise created by the platform. In some cases, a community of users may collaborate on a case on the platform. One user may create the association while another user can verify the association. This verification process may increase the strength of the association.

(3) An aging rate of the association: An aging rate may indicate a rate of reduction in the strength of the association over a certain time period. For example, if the predetermined time period has passed since the creation (and/or the last modification) of the association, association engine 121 may apply the aging rate to the strength of the association, reducing the strength by an amount defined by the aging rate. This makes sense because recent associations are more likely to be still accurate and therefore should be assigned a higher strength.

(4) A quality of evidence that supports the association: By taking the quality of evidence into consideration, erroneous conclusions based on faked or spurious associations could be avoided. For example, two different files can be easily named identically to avoid detection. Although an association could have been created between these two files based on having the same file name, the strength of this association should be relatively low because of a low evidence quality of the file name. On the other hand, the hash value of a given file characterizes the file uniquely and thus provides strong evidence that two files with the same hash value actually refer to the same file. Thus, a first association between the two files having the same hash value may be given a higher strength than a second association between the two files sharing the same file name. In another example, an association between two emails can be created based on the two emails sharing the same subject line. The strength of this association should be lower than the strength of an association between the two emails having information about mail servers used in delivering those emails.

Note that the strength of the association may be dynamically adjusted as any of the parameters change. In some cases, the strength may be adjusted manually based on user input. As the strength is adjusted, scores (including an indicator score as discussed herein with respect to indicator score engine 122) for any of the data records being connected by the association may be also adjusted or otherwise updated. Further, a change in the strength of a first association between a first data record and a second data record may influence a score for a third data record that is connected to the second data record via a second association. Similarly, the change in the strength of the first association may further influence a score for a fourth data record that is connected to the third data record via a third association, and so forth.

Indicator score engine 122 may determine an indicator score for a data record comprising a security indicator (e.g., the security indicator comprising at least one observable) based on various parameters including, but not being limited to: a severity of a security threat posed by the security indicator (e.g., a higher level of severity may result in a higher indicator score), a number of sightings of the observable (e.g., an indication that the observable is sighted and/or observed may positively influence the indicator score. The technique to determine the number of the sightings of an observable is discussed herein with respect to association engine 121), a reliability of a source entity for the security indicator (e.g., if the security indicator is provided by a reliable source entity, it may result in a higher indicator score), user feedback indicating whether the security indicator is malicious and/or accurate submitted by users of the security information sharing platform (e.g., the platform users may help determine the accuracy of the security indicator. A large number of votes validating the accuracy of the indicator may result in a higher indicator score), and the associations created between the data record and other data records (and/or strengths thereof).

For example, a higher strength of a first association between a first data record (e.g., comprising a security indicator) and a second data record may result in a higher indicator score for the security indicator. As the strength of the first association is changed based on any of the parameters as discussed herein with respect to association engine 121, the indicator score for the security indicator may also re-determined or otherwise adjusted. Further, a change in the strength of the first association may influence a score for a third data record that is connected to the second data record via a second association. Similarly, the change in the strength of the first association may further influence a score for a fourth data record that is connected to the third data record via a third association, and so forth.

In some implementations, a recommendation and/or a recommended action may be generated or otherwise provided based on the indicator score (e.g., as discussed herein with respect to indicator score engine 122) of the security indicator. For example, if the indicator score is below a first threshold value, the indicator can be continued to be monitored without any further action. If the indicator score is above the first threshold value but below a second threshold value, the recommendation may be generated to inform at least one user to perform a further investigation on the security indicator. If the indicator score is above a third threshold value, the indicator may be considered to be malicious and/or accurate that could pose an actual security threat. In this case, any event that matches this security indicator may be blocked from accessing certain resources.

Search engine 123 may obtain a search query (e.g., the search query may be submitted by a user of the security information sharing platform). In some implementations, the search query may specify a particular security indicator that a user may want to find more information about. In response to the search query, search engine 123 may identify a set of data records that satisfy the search query. The set of data records may be the records that have associations with the particular security indicator (e.g., associations created by association engine 121). Returning to the above example, the search based on the particular security indicator may return the second group and/or any information that may be associated with the second group. For example, the security indicators that have been created and/or submitted by the users of the second group may be returned in response to the search query. Other associated data records such as malware samples, other observables, threat actors, etc. may also be returned as part of the search results.

Visual representation engine 124 may create or otherwise provide a visual representation of data records and/or associations among those data records. A visual representation may include data records as nodes and associations between the data records as edges. For example, a particular security indicator may be shown in the visual representation as a first node while an associated data record (e.g., a malware sample) may be shown as a second node. The association between the particular security indicator and the associated data record may be depicted as an edge in the visual representation. In some implementations, a visual representation of a certain set of data records and their associations may be provided in response to a search query.

In some implementations, a user may zoom in and/or out of the visual representation to see a specific part of the representation, and may be given an option to drill down each node and/or edge to review information about that node (e.g., a score for the corresponding data record such as an indicator score, a creation or modified time of the corresponding data record, a source entity that created and/or modified the corresponding data record, etc.) and/or information about that edge (e.g., strength of the corresponding association, a creation or modified time of the corresponding association, a source entity that created and/or modified the corresponding association, etc.). For example, visual representation engine 124 may receive an indication that a node or an edge is selected by user input via the visual representation. In response to the indication, visual representation engine 124 may cause information about the data record corresponding to that node or the association corresponding to that edge to be displayed adjacent to that node or that edge on the visual representation. This information may be displayed if a user hovers over that node or edge using a cursor and/or clicks on that node or edge via the visual representation, for example.

Nodes and/or edges of the visual representation may appear visually different based on their properties. Such visual difference can be depicted in different colors, thickness, lengths, pattern (e.g., solid or dotted line, shaded, etc.), sizes, icons, directions, and/or any other visual indicators. For example, a node may appear visually different based on the corresponding data record's score (e.g., the size of the node may vary based on the score, the color of the node may vary based on the score, etc.). In another example a node may appear visually different based on a type of the corresponding data record (e.g., the data record provided by an external resource that is external to the platform may be color-coded).

An edge may appear visually different based on: an indication that the corresponding association has been verified by a trusted authority, a type of the corresponding association, strength of the corresponding association, and/or other properties of the association. In one example, an edge may appear visually different based on an indication that the corresponding association has been verified by a trusted authority. A user may create an association between a first data record having a security indicator and a second data record having a threat actor who is behind the threat posed by the security indicator. At the time of creation of the association, the edge corresponding to this association may appear as a non-solid line (e.g., dotted line). If the association is verified by a trusted authority (e.g., another user of the platform, a third-party analyst, a government agency, etc.), the edge may change its visual appearance (e.g., the non-solid line may change to a solid line) to show that the association has been verified.

In another example, an edge may appear visually different based on a type of the corresponding association. The type of the association may comprise at least one of: a type that identifies a source entity (e.g., a first data record having a security indicator "originates from" a second data record having a source entity of that security indicator), a type that indicates that a domain name points to an Internet Protocol (IP) address (e.g., a first data record having a domain name "points to" a second data record having an IP address), a type that identifies a threat actor for a security indicator (e.g., a first data record having a security indicator "has been associated with" a second data record having a threat actor), a type that identifies a domain name as a command and control (C&C) server for a malware (e.g., a first data record having a domain name "is a C&C server for" a second data record having a malware description), a type that indicates that two threat actors have collaborated (e.g., a first data record having a first threat actor "collaborates with" a second data record having a second threat actor), and/or other types. Depending on the type of the association, the edge may be visually different in color, pattern, thickness, length, etc. For example, for the type that indicates that a domain name points to an IP address, the edge may be depicted as a directed arrow line with an arrow pointing to the node representing the IP address.

In yet another example, edges may be shown visually different from each other based on the strength of the associations (e.g., a technique to determine the strength of the associations are discussed herein with respect to association engine 121). Varying strengths may be depicted in different lengths, thicknesses, colors, patterns, etc. For example, a first edge may be shown shorter than a second edge if the association represented by the first edge is stronger that the association represented by the second edge. In another example, the first edge may be shown thicker than the second edge. In yet another example, the first edge may be shown in a different color than the second edge.

In some implementations, the visual representation may be interactive such that a user may interact with the visual representation to modify any portions of the visual representation (e.g., add a new node/edge, remove an existing node/edge, change properties of node/edge such as the score for a node, the strength of an association, etc.). For example, an edge may be modified such that the strength of the association that the edge represents is modified. A user may hover over using a cursor or click on the edge to view the properties of the edge such as its strength. From there, the user may increase or decrease the strength level by changing the level. Alternatively, a user may modify the properties of the edge by visually modifying the edge (e.g., by changing the edge's length, thickness, color, etc.). In another example, by adding a new edge between two data records via the visual representation, a new association between those two data records may be created in the security information sharing platform by association engine 121. Similarly, by removing an existing edge between two records via the visual representation, the association corresponding to that edge may be deleted from the security information sharing platform.

In some implementations, as a user interacts with the visual representation by modifying certain nodes and/or edges, scores (e.g., an indicator score as discussed herein with respect to indicator score engine 122, threat actor score for a data record having a threat actor, etc.) for some data records may be adjusted, re-determined, or otherwise updated. For example, if a user adds an edge between a first node representing a first security indicator and a second node representing a source entity for the first security indicator, the indicator score for the first security indicator may be re-determined by indicator score engine 122 by taking the reliability level of the source entity into consideration. Assuming that the source entity has an association with a second security indicator, indicator score engine 122 may adjust and/or re-determine the indicator score for the first security indicator as well as the indicator score for the second security indicator based on their newly created connection. Further, a change in the strength of a first association between a first data record and a second data record may influence a score for a third data record that is connected to the second data record via a second association. Similarly, the change in the strength of the first association may further influence a score for a fourth data record that is connected to the third data record via a third association, and so forth.

In performing their respective functions, engines 121-124 may access data storage 129 and/or other suitable database(s). Data storage 129 may represent any memory accessible to visualization system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Visualization system 110 may access data storage 129 locally or remotely via network 50 or other networks.

Data storage 129 may include a database to organize and store data. The database may reside in a single or multiple physical device(s) and in a single or multiple physical location(s). The database may store a plurality of types of data and/or files and associated data or file description, administrative information, or any other data.

Figure 2:
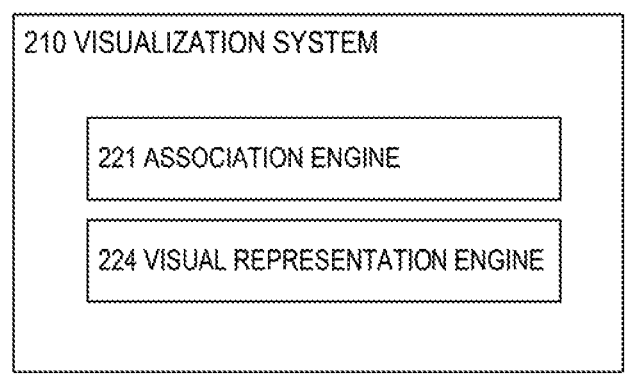
FIG. 2 is a block diagram depicting an example visualization system.

FIG. 2 is a block diagram depicting an example visualization system 210. Visualization system 210 may comprise an association engine 221, and a visualization engine 224, and/or other engines. Engines 221 and 224 represent engines 121 and 124, respectively.

Figure 3:
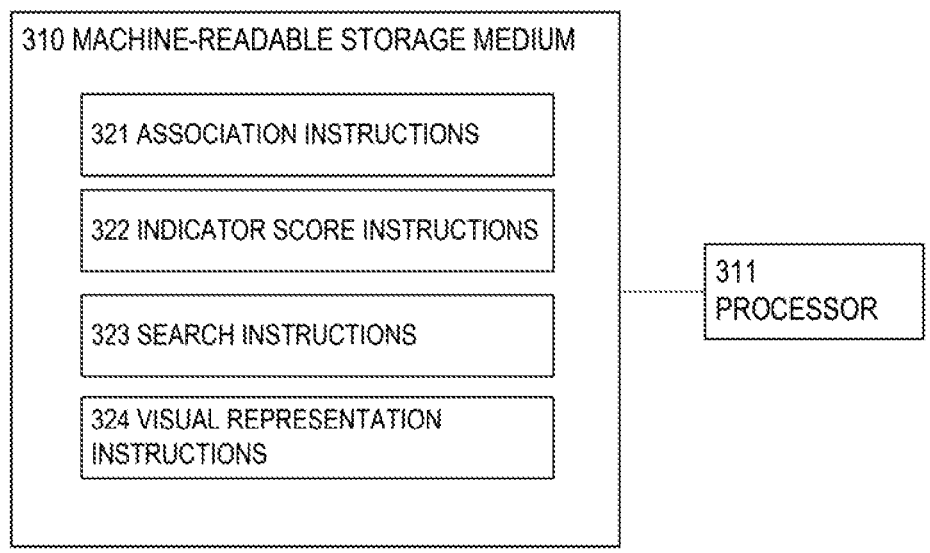
FIG. 3 is a block diagram depicting an example machine-readable storage medium comprising instructions executable by a processor for visualization of associations among data records in a security information sharing platform.

FIG. 3 is a block diagram depicting an example machine-readable storage medium 310 comprising instructions executable by a processor for visualization of associations among data records in a security information sharing platform.

In the foregoing discussion, engines 121-124 were described as combinations of hardware and programming. Engines 121-124 may be implemented in a number of fashions. Referring to FIG. 3, the programming may be processor executable instructions 321-324 stored on a machine-readable storage medium 310 and the hardware may include a processor 311 for executing those instructions. Thus, machine-readable storage medium 310 can be said to store program instructions or code that when executed by processor 311 implements visualization system 110 of FIG. 1.

In FIG. 3, the executable program instructions in machine-readable storage medium 310 are depicted as association instructions 321, indicator score instructions 322, search instructions 323, and visual representation instructions 324. Instructions 321-324 represent program instructions that, when executed, cause processor 311 to implement engines 121-124, respectively.

Figure 4:
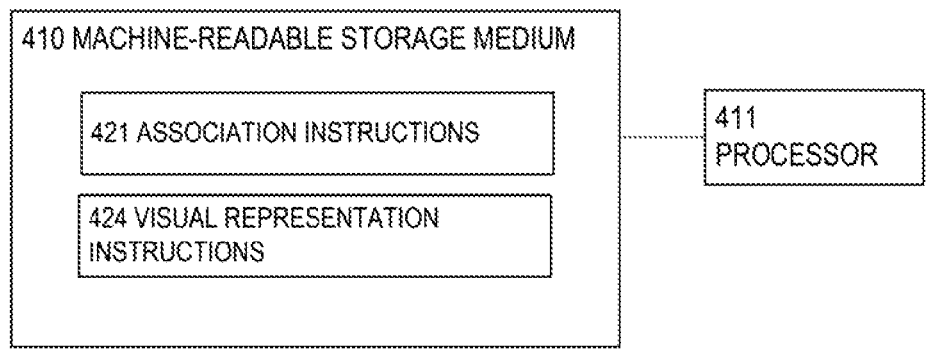
FIG. 4 is a block diagram depicting an example machine-readable storage medium comprising instructions executable by a processor for visualization of associations among data records in a security information sharing platform.

FIG. 4 is a block diagram depicting an example machine-readable storage medium 410 comprising instructions executable by a processor for visualization of associations among data records in a security information sharing platform.

Referring to FIG. 4, the programming may be processor executable instructions 421 and 424 stored on a machine-readable storage medium 410 and the hardware may include a processor 411 for executing those instructions. Thus, machine-readable storage medium 410 can be said to store program instructions or code that when executed by processor 411 implements visualization system 110 of FIG. 1.

In FIG. 4, the executable program instructions in machine-readable storage medium 410 are depicted as association instructions 421 and visual representation instructions 424. Instructions 421 and 424 represent program instructions that, when executed, cause processor 411 to implement engines 121 and 124, respectively.

Machine-readable storage medium 310 (or machine-readable storage medium 410) may be any electronic, magnetic, optical, or other physical storage device that contains or stores executable instructions. In some implementations, machine-readable storage medium 310 (or machine-readable storage medium 410) may be a non-transitory storage medium, where the term "non-transitory" does not encompass transitory propagating signals. Machine-readable storage medium 310 (or machine-readable storage medium 410) may be implemented in a single device or distributed across devices. Likewise, processor 311 (or processor 411) may represent any number of processors capable of executing instructions stored by machine-readable storage medium 310 (or machine-readable storage medium 410). Processor 311 (or processor 411) may be integrated in a single device or distributed across devices. Further, machine-readable storage medium 310 (or machine-readable storage medium 410) may be fully or partially integrated in the same device as processor 311 (or processor 411), or it may be separate but accessible to that device and processor 311 (or processor 411).

In one example, the program instructions may be part of an installation package that when installed can be executed by processor 311 (or processor 411) to implement visualization system 110. In this case, machine-readable storage medium 310 (or machine-readable storage medium 410) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 (or machine-readable storage medium 410) may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-324, and/or other instructions. As an alternative or in addition to retrieving and executing instructions, processor 311 may include at least one electronic circuit comprising a number of electronic components for performing the functionality of at least one of instructions 321-324, and/or other instructions.

Processor 411 may be at least one central processing unit (CPU), microprocessor, and/or other hardware device suitable for retrieval and execution of instructions stored in machine-readable storage medium 410. Processor 411 may fetch, decode, and execute program instructions 421 and 424, and/or other instructions. As an alternative or in addition to retrieving and executing instructions, processor 411 may include at least one electronic circuit comprising a number of electronic components for performing the functionality of at least one of instructions 421 and 424, and/or other instructions.

Figure 5:
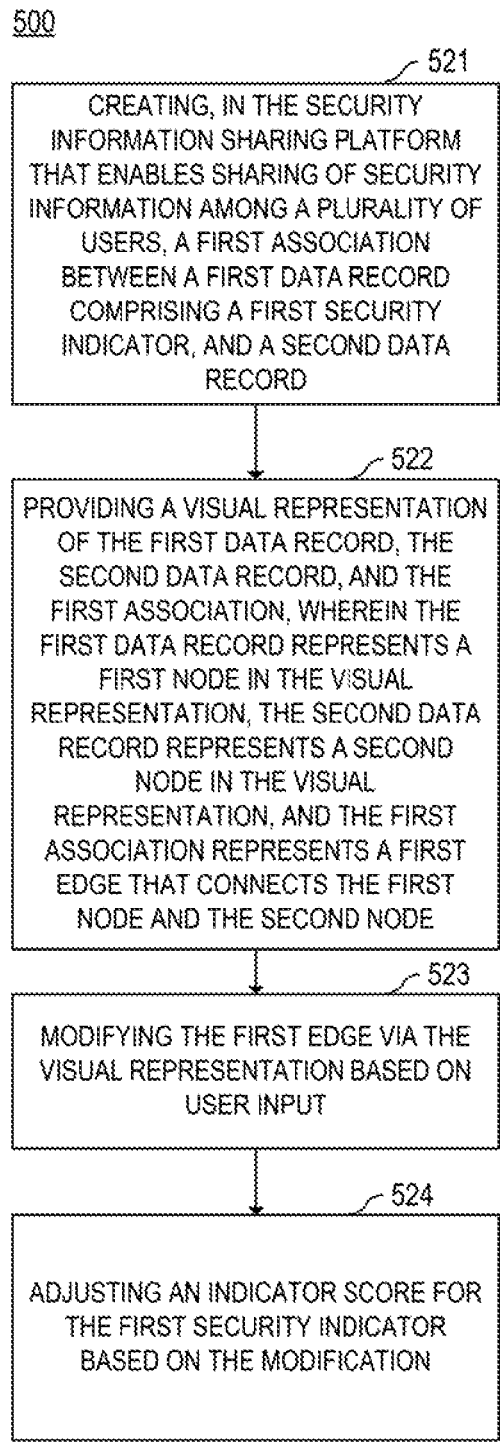
FIG. 5 is a flow diagram depicting an example method for visualization of associations among data records in a security information sharing platform.

FIG. 5 is a flow diagram depicting an example method 500 for visualization of associations among data records in a security information sharing platform. The various processing blocks and/or data flows depicted in FIG. 5 (and in the other drawing figures such as FIG. 6) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 500 as illustrated (and described in greater detail below) is meant be an example and, as such, should not be viewed as limiting. Method 500 may be implemented in the form of executable instructions stored on a machine-readable storage medium, such as storage medium 310, and/or in the form of electronic circuitry.

In block 521, method 500 may include creating, in the security information sharing platform that enables sharing of security information among a plurality of users, a first association between a first data record comprising a first security indicator, and a second data record. Referring back to FIG. 1, association engine 121 may be responsible for implementing block 521.

In block 522, method 500 may include providing a visual representation of the first data record, the second data record, and the first association, wherein the first data record represents a first node in the visual representation, the second data record represents a second node in the visual representation, and the first association represents a first edge that connects the first node and the second node. Referring back to FIG. 1, visual representation engine 124 may be responsible for implementing block 522.

In block 523, method 500 may include modifying the first edge via the visual representation based on user input. Referring back to FIG. 1, visual representation engine 124 may be responsible for implementing block 523.

In block 524, method 500 may include adjusting an indicator score for the first security indicator based on the modification. Referring back to FIG. 1, indicator score engine 122 may be responsible for implementing block 524.

Figure 6:
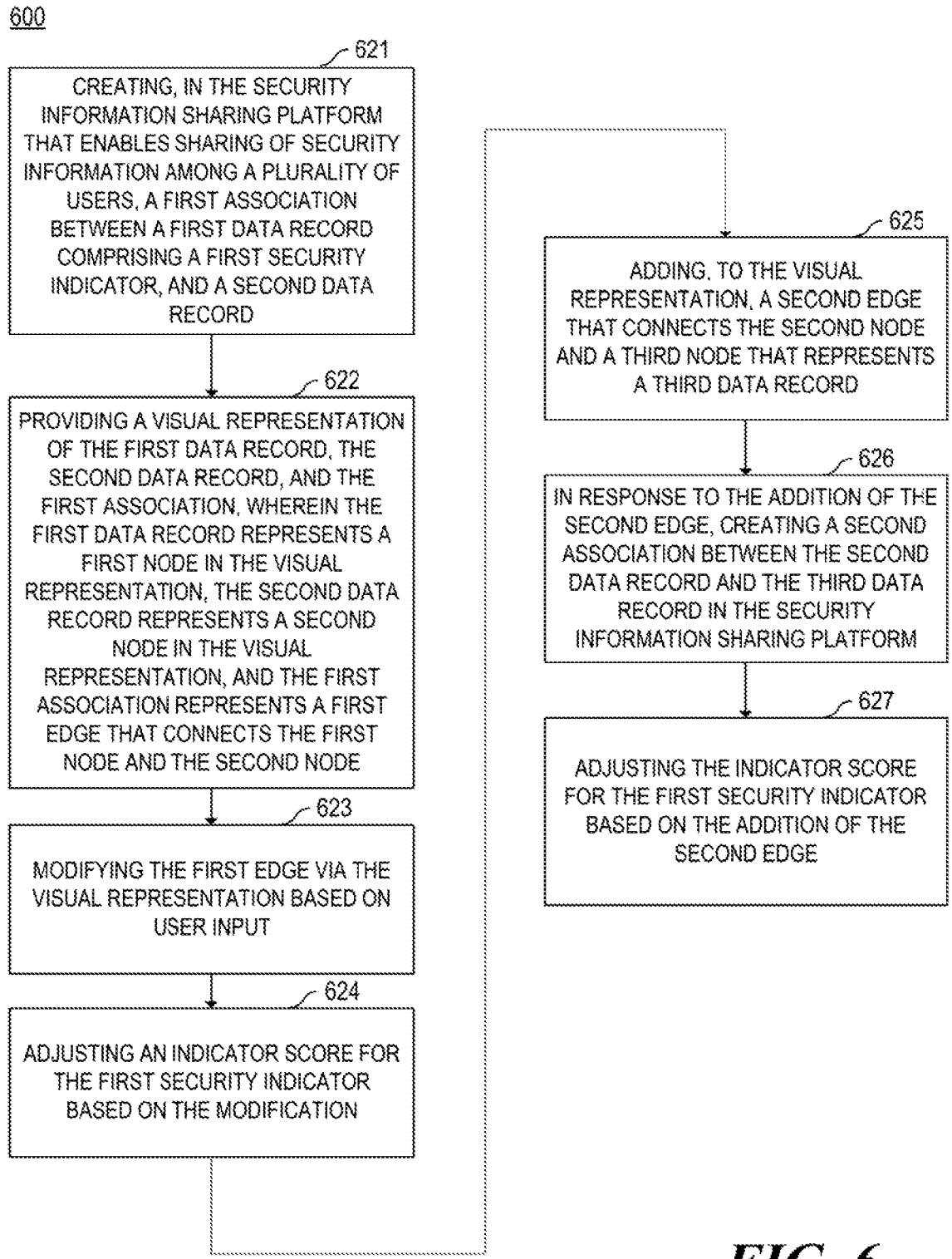
FIG. 6 is a flow diagram depicting an example method for visualization of associations among data records in a security information sharing platform.

FIG. 6 is a flow diagram depicting an example method 600 for visualization of associations among data records in a security information sharing platform. Method 600 as illustrated (and described in greater detail below) is meant to be an example and, as such, should not be viewed as limiting. Method 600 may be implemented in the form of executable instructions stored on a machine-readable storage medium, such as storage medium 310, and/or in the form of electronic circuitry.

In block 621, method 600 may include creating, in the security information sharing platform that enables sharing of security information among a plurality of users, a first association between a first data record comprising a first security indicator, and a second data record. Referring back to FIG. 1, association engine 121 may be responsible for implementing block 621.

In block 622, method 600 may include providing a visual representation of the first data record, the second data record, and the first association, wherein the first data record represents a first node in the visual representation, the second data record represents a second node in the visual representation, and the first association represents a first edge that connects the first node and the second node. Referring back to FIG. 1, visual representation engine 124 may be responsible for implementing block 622.

In block 623, method 600 may include modifying the first edge via the visual representation based on user input. Referring back to FIG. 1, visual representation engine 124 may be responsible for implementing block 623.

In block 624, method 600 may include adjusting an indicator score for the first security indicator based on the modification. Referring back to FIG. 1, indicator score engine 122 may be responsible for implementing block 624.

In block 625, method 600 may include adding, to the visual representation, a second edge that connects the second node and the third node. Referring back to FIG. 1, visual representation engine 124 may be responsible for implementing block 625.

In block 626, method 600 may include, in response to the addition of the second edge, creating a second association between the second data record and the third data record in the security information sharing platform. Referring back to FIG. 1, association engine 121 may be responsible for implementing block 626.

In block 627, method 600 may include adjusting the indicator score for the first security indicator based on the addition of the second edge. Referring back to FIG. 1, indicator score engine 122 may be responsible for implementing block 627.

The foregoing disclosure describes a number of example implementations for visualization of associations among data records in a security information sharing platform. The disclosed examples may include systems, devices, computer-readable storage media, and methods for visualization of associations among data records in a security information sharing platform. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for visualization of associations among data records in a security information sharing platform, the method comprising:
   creating, in the security information sharing platform that enables sharing of security information among a plurality of users, a first association between a first data record comprising a first security indicator, and a second data record;
   causing display of a visual representation in a graphical user interface, the visual representation comprising a first node, a second node, and a first edge between the first node and the second node, wherein the first node represents the first data record, wherein the second node represents the second data record, and wherein the first edge represents the first association between the first node and the second node;
   in response to a first user interaction with the first edge in the visual representation, providing a drill down option for the first edge in the visual representation to display a strength of the first association and information on which the strength of the first association is based;
   modifying the strength of the first association in response to a second user interaction with the first edge using the drill down option in the visual representation; and
   adjusting an indicator score for the first security indicator in response to the modification of the strength of the first association.

2. The method of claim 1, comprising:
   determining the strength of the first association based on at least one of:
   a likelihood of change in the first association;
   a creator of the first association;
   an aging rate of the first association; or
   a quality of evidence that supports the first association.

3. The method of claim 1, wherein the second data record represents at least one of: a second security indicator, an organization, an industry sector, a geography, a community of the security information sharing platform, a domain name, or a threat actor.

4. The method of claim 1, wherein the visual representation comprises a third node that represents a third data record, and the method further comprising:
   adding, to the visual representation, a second edge that connects the second node and the third node;
   in response to the addition of the second edge, creating a second association between the second data record and the third data record in the security information sharing platform; and
   adjusting the indicator score for the first security indicator based on the addition of the second edge.

5. The method of claim 4, wherein the second data record is a threat actor, and the method further comprising:
   adjusting a threat actor score for the second data record.

6. The method of claim 1, wherein the first security indicator includes an observable, and the method further comprising:
   determining the indicator score for the first security indicator based on at least one of: a severity of a security threat posed by the first security indicator, a number of sightings of the observable, a reliability of a source entity for the first security indicator, or user feedback indicating whether the first security indicator is accurately submitted by the plurality of users of the security information sharing platform.

7. The method of claim 6, comprising:
   obtaining, from a first source entity associated with the second data record, a first sighting of the observable, the first sighting of the observable indicating that the observable has been observed by the first source entity;
   obtaining, from a second source entity associated with the second data record, a second sighting of the observable, the second sighting of the observable indicating that the observable has been observed by the second source entity;
   determining a number of sightings of the observable, the number of sightings of the observable including the first sighting and the second sighting of the observable; and
   creating, in the security information sharing platform, the first association based on the number of sightings of the observable.

8. The method of claim 1, comprising:
   causing the first edge to have a visual appearance indicating that the first association has been verified by a trusted authority.

9. The method of claim 1, wherein the information on which the strength of the first association is based includes a creation time and/or a modified time of the first association, a source identity that created and/or modified the first association, and/or a combination thereof.

10. The method of claim 1, comprising:
    in response to the modification of the strength of the first association based on the second user interaction with the first edge using the drill down option in the visual representation, adjusting the first security indicator for the first data record, causing an information update associated with the first data record and the second data record corresponding to the first association, and updating a display in the graphical user interface adjacent to the first node or the second node based on the modification of the strength of the first association.

11. A non-transitory machine-readable storage medium comprising instructions executable by a processor to:
    create, in a security information sharing platform, a first association between a first data record and a second data record, the first data record comprising a first security indicator;
    cause display of a visual representation in a graphical user interface, the visual representation comprising a first node, a second node, and a first edge between the first node and the second node, wherein the first node represents the first data record, wherein the second node represents the second data record, and wherein the first edge represents the first association between the first data record and the second data record;
    in response to a first user interaction with the first edge in the visual representation, provide a drill down option for the first edge in the visual representation to display a strength of the first association and information on which the strength of the first association is based;

modify the strength of the first association in response to a second user interaction with the first edge using the drill down option in the visual representation; and adjust an indicator score for the first security indicator in response to the modification of the strength of the first association.

12. The non-transitory machine-readable storage medium of claim 11, wherein the second data record represents at least one of: a second security indicator, an organization, an industry sector, a geography, a community of the security information sharing platform, a domain name, or a threat actor.

13. The non-transitory machine-readable storage medium of claim 11, the instructions executable by the processor to:
cause the first edge to have a visual appearance indicating that the first association has been verified by a trusted authority.

14. The non-transitory machine-readable storage medium of claim 11, the instructions executable by the processor to:
in response to the modification of the strength of the first association based on the second user interaction with the first edge using the drill down option in the visual representation, adjust the first security indicator for the first data record, cause an information update associated with the first data record and the second data record corresponding to the first association, and update a display in the graphical user interface adjacent to the first node or the second node based on the modification of the strength of the first association.

15. A system for visualization of associations among data records in a security information sharing platform comprising:
a hardware processor that:
creates, in the security information sharing platform that enables sharing of security information among a plurality of users, a first association between a first data record comprising a first security indicator, and a second data record;
determines a strength of the first association between the first data record and the second data record based on at least one of: a likelihood of change in the first association over time; a creator of the first association; an aging rate of the first association; or a quality of evidence that supports the first association; and
causes display of a visual representation in a graphical user interface, the visual representation comprising a first node, a second node, and a first edge between the first and second nodes, wherein the first node represents the first data record, wherein the second node represents the second data record, and wherein the first edge represents the first association between the first and second nodes;
in response to a first user interaction with the first edge in the visual representation, provide a drill down option for the first edge in the visual representation to display the strength of the first association and information on which the strength of the first association is based;
modify the strength of the first association in response to a second user interaction with the first edge using the drill down option in the visual representation; and
adjust an indicator score for the first security indicator in response to the modification of the strength of the first association.

16. The system of claim 15, the hardware processor that:
creates, in the security information sharing platform, a second association between the second data record and a third data record; and
adjusts the indicator score for the first security indicator in response to the creation of the second association.

17. The system of claim 16, wherein the visual representation includes a third node that represents the third data record, and a second edge between the second and third nodes, the hardware processor that:
causes the second edge to have a visual appearance indicating a type of the second association, the type of the second association comprising at least one of: a first type that identifies a source entity, a second type that indicates that a domain name points to an Internet Protocol (IP) address, a third type that identifies a threat actor for a second security indicator, a fourth type that identifies a domain name as a command and control (C&C) server for a malware, or a fifth type that indicates that two threat actors have collaborated.

18. The system of claim 15, wherein the second data record represents at least one of: a second security indicator, an organization, an industry sector, a geography, a community of the security information sharing platform, a domain name, or a threat actor.

19. The system of claim 15, wherein the hardware processor causes the first edge to have a visual appearance indicating that the first association has been verified by a trusted authority.

20. The system of claim 15, wherein, in response to the modification of the strength of the first association based on the second user interaction with the first edge in the drill down option in the visual representation, the hardware processor:
adjusts the first security indicator for the first data record, causes an information update associated with the first data record and the second data record corresponding to the first association, and updates a display in the graphical user interface adjacent to the first node or the second node based on the modification of the strength of the first association.

* * * * *